US007539354B2

(12) United States Patent
Hardy et al.

(10) Patent No.: US 7,539,354 B2
(45) Date of Patent: May 26, 2009

(54) IMAGE DATABASE KEY GENERATION METHOD

(75) Inventors: Stephen James Hardy, West Pymble (AU); Peter Alleine Fletcher, Rozelle (AU); Kieran Gerard Larkin, Putney (AU); Ian Richard Gibson, Coogee (AU)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 11/195,644

(22) Filed: Aug. 3, 2005

(65) Prior Publication Data

US 2006/0050985 A1 Mar. 9, 2006

(30) Foreign Application Priority Data

Aug. 25, 2004 (AU) ............................... 2004904856

(51) Int. Cl.
*G06K 9/36* (2006.01)
(52) U.S. Cl. ........................ 382/276; 382/295; 382/280; 713/176
(58) Field of Classification Search ................. 382/276, 382/280, 295, 296; 358/3.28; 713/176
See application file for complete search history.

(56) References Cited

U.S. PATENT DOCUMENTS

| 6,182,218 | B1 * | 1/2001 | Saito ........................... 713/176 |
| 6,628,845 | B1 * | 9/2003 | Stone et al. ................... 382/294 |
| 6,959,386 | B2 * | 10/2005 | Rhoads ........................ 713/176 |
| 7,062,069 | B2 * | 6/2006 | Rhoads ........................ 382/100 |
| 2002/0112171 | A1 * | 8/2002 | Ginter et al. ................. 713/185 |
| 2003/0110163 | A1 | 6/2003 | Chen et al. ...................... 707/3 |
| 2004/0086197 | A1 * | 5/2004 | Fletcher et al. .............. 382/276 |

FOREIGN PATENT DOCUMENTS

WO 2001/054331 7/2001
WO 2002/093930 11/2002

OTHER PUBLICATIONS

Derrode, S. et al., "Invariant content-based image retrieval using a complete set of Fourier-Mellin descriptors", IEEE International Conference on Multimedia Computing and Systems, Jul. 1999, vol. 2, pp. 877-881. Online: accessed May 25, 2007. URL: http://www.fresnel.fr/perso/derrode/publi/lcmcs99.pdf.
Lin, et al., "Rotation, Scale, and Translation Resilient Watermarking for Images", IEEE Transactions on Image Processing, May 5, 2001, vol. 10, No. 5, pp. 767-782. Online: accessed May 25, 2007. URL: http://www.adastral.ucl.ac.uk/~icox/papers/2001/TransIP01.pdf.

* cited by examiner

*Primary Examiner*—Bhavesh M Mehta
*Assistant Examiner*—Stephen R. Koziol
(74) *Attorney, Agent, or Firm*—Fitzpatrick, Cella, Harper & Scinto

(57) ABSTRACT

A method of generating a matching key for an image is disclosed. The matching key is substantially invariant to rotation, scale and translation. The method starts by forming a spatial domain representation of the image that is substantially invariant to translation of the image. Rotation and/or scaling in the spatial domain representation is next transformed into translation to form a transformed image. A representation of the transformed image is then formed that is substantially invariant to translation of the transformed image. The representation of the transformed image is the matching key for the image.

16 Claims, 11 Drawing Sheets

IMAGE DATABASE KEY GENERATION METHOD

FIELD OF THE INVENTION

The current invention relates generally to creating databases of documents and, in particular, to generating keys for indexing of these databases that are robust to printing and scanning.

BACKGROUND

In most office environments, large numbers of documents are printed daily, and the task of organising and filing all of these documents, both physical and electronic versions, is becoming more difficult due to the increasing volume of such documents. A common problem experienced by users is finding the location of an electronic version of a document when the user only has a printed copy. Occasionally this problem is solved by printing some identifier on the printed copy of the document, with the identifier containing the information specifying where the electronic version of the document is stored. However, in certain circumstances such additional information cannot be added to the printed document, either for aesthetic or other reasons.

Another common problem is experienced when the user wishes to generate more copies of a printed document. Often this is simply achieved by photocopying the document. However, a photocopy of a document is generally not as accurate or as sharp as a print from the electronic version, especially where colour continuous tone images are concerned. Furthermore, for a large document, the process of scanning in the entire document, all of which may not be readily available in a condition suitable for copying, may take a considerable amount of time, which is undesirable. Accordingly, rather than photocopying the document, scanning a single page of the document and finding the electronic version of the document from which the single page was printed, and then reprinting the document from the retrieved electronic version of the document is a preferable method of obtaining new copies of the document.

A prior art method exists which involves generating a database of documents that have been printed. The database is indexed in such a way that the electronic files can be found from a scan of a document. Such databases can often be massive in size. Accordingly, a method of generating an indexing key which can be searched for in the database both efficiently and accurately is an important problem that must be solved to enable the desired functionality in a practical application.

One solution to this problem of image indexing key generation existing in the art is to perform block classification of the document that is scanned, identifying regions of the documents that are paragraphs of text and those regions that are images and graphics, and building a comparison function based on this classification. The downside to this method, and methods similar thereto, is that such methods are sensitive to variations in the printing and scanning process, and that such methods cannot properly distinguish between documents with very similar structural layout.

Another existing method of generating an image indexing key is to use a Fourier-Mellin invariant descriptor (FMID). A FMID is largely rotation, scale and translation (RST) invariant. That is, the FMID generated from an image is similar to the FMID generated from a rotated, scaled and/or translated version of that image. FIG. 1 shows a flow diagram of this prior art method 180 of image key generation. In this method 180, a key is generated from the input image received in step 100 by first applying a Fourier transform to the input image in step 110. The complex magnitude of the result of step 110 is then calculated in step 120. The complex magnitude is log-polar transformed in step 130, and the Fourier transform of the result of the log-polar transform is performed in step 140. The complex magnitude of the result of step 140 is calculated in step 150. The image key, output in step 170, is then calculated in step 160 by taking moments of the result of step 150.

A drawback of the method 180 described with reference to FIG. 1 is that, though the FMID is formally rotation, scale and translation invariant, it is not very discriminatory. In particular, the FMID does not distinguish well between images that are similar in their low spatial frequency structure, but differ in their high spatial frequency structure. This is a particular problem for discriminating between images of text documents that have a largely similar structural appearance, but differ in their textual content, as the textual content is represented by high spatial frequency phase structures in the image that do not survive the FMID generation process.

SUMMARY

It is an object of the present invention to substantially overcome, or at least ameliorate, one or more disadvantages of existing arrangements.

According to a first aspect of the present invention, there is provided a method of generating a matching key for an image with said matching key being substantially invariant to rotation, scale and translation, said method comprising the steps of:

forming a spatial domain representation of said image that is substantially invariant to translation of said image;

transforming rotation and/or scaling in said spatial domain representation into translation to form a transformed image; and forming a representation of said transformed image that is substantially invariant to translation of said transformed image, said representation of said transformed image being said matching key for said image.

According to a second aspect of the present invention, there is provided a method of generating a matching key for an image with said matching key being substantially invariant to rotation, scale and translation, said method comprising the steps of:

forming a multi-channel image of said image by applying an operator to said image, said operator being commutative within a constant to rotation and scale;

forming a representation of said multi-channel image that is substantially invariant to translation of said multi-channel image;

transforming rotation and/or scaling in said representation to translation to form a transformed image; and forming a representation of said transformed image that is substantially invariant to translation of said transformed image, said representation of said transformed image being said matching key for said image.

According to another aspect of the present invention, there is provided a method of generating a matching key for an image, said method including the steps of:

forming a representation of said image that is substantially invariant to translation of said image by retaining translation invariant parts of the Fourier phase; and using said representation as said matching key for said image.

According to another aspect of the present invention, there is provided a method of storing a document in a database, said method comprising the steps of:

creating one or more images of said document;

generating a matching key for each image of said document according to any one of the abovementioned methods;

storing said document and said matching keys in said database, wherein any one of said matching keys index said document.

According to another aspect of the present invention, there is provided an apparatus for implementing any one of the aforementioned methods.

According to yet another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION

Figure 1:
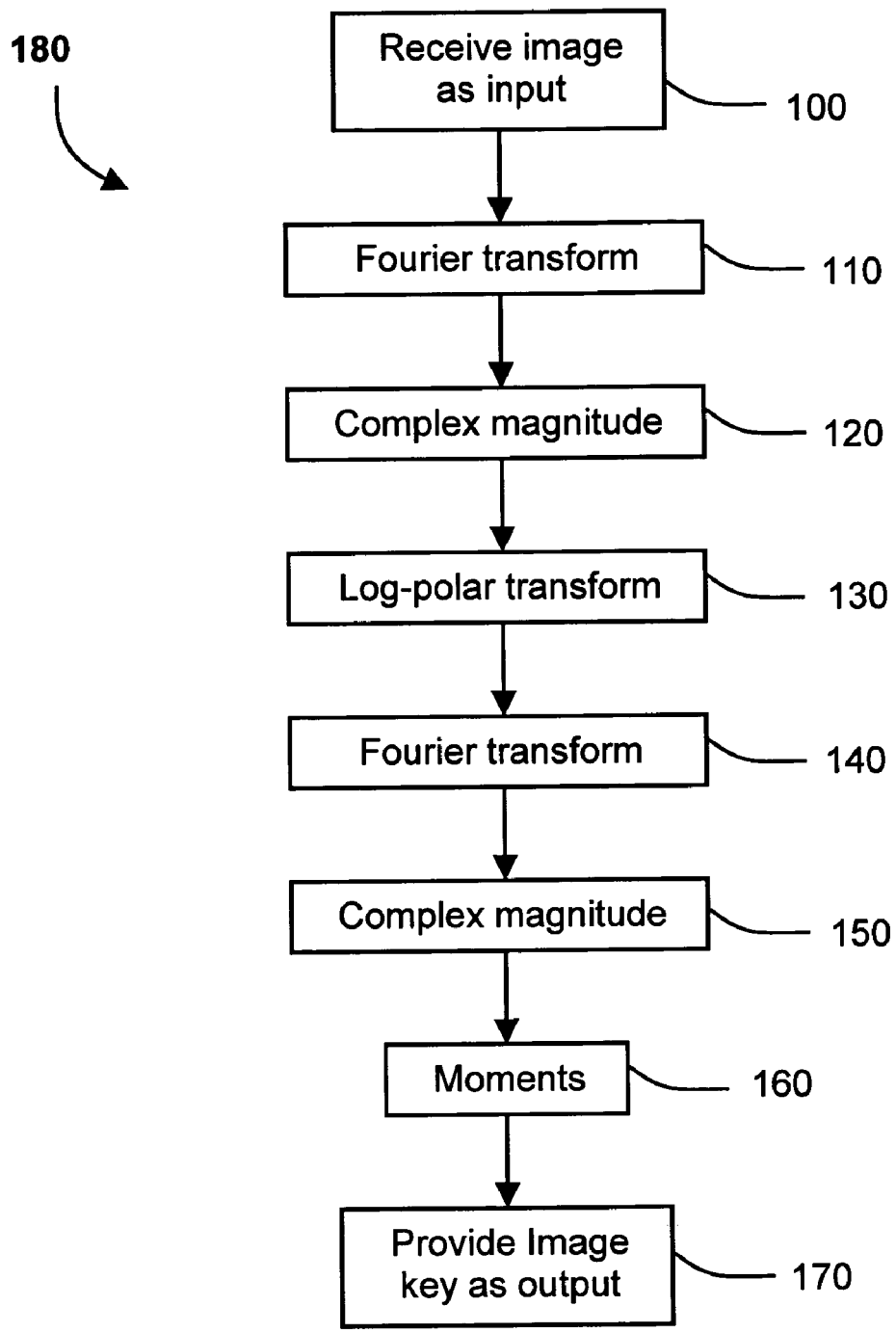
FIG. 1 shows a flow diagram of a prior art method of image key generation.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art methods relate to discussions of documents which form public knowledge through their respective publication. Such should not be interpreted as a representation by the present inventors or patent applicant that such documents in any way form part of the common general knowledge in the art.

To both explain the functioning of the invention and illustrate the advantage of the invention over the prior art, some theory of rotation scale and translation invariance based on the Fourier transform is now introduced. Throughout this section mathematical notation is used that is based on continuous function theory. This is for notational convenience only, and should not be considered limiting, as all calculations in the preferred embodiment of the invention are performed on sampled imaged data represented by finite precision arithmetic, and all Fourier transforms are performed using the discrete Fourier transform, and derivative operators may be performed using finite differences. It is also to be understood that there are a number of other mathematical notations and approaches that can be used to describe the same system, such as vector algebra, matrix algebra, and other equivalent algebraic systems, and that such notations and approaches are equivalent to those used here.

The Fourier transform of a two-dimensional function I(x,y) may be written as:

$$\Im[I](u, v) = \int_{-\infty}^{\infty}\int_{-\infty}^{\infty} I(x, y)e^{-2\pi i x u}e^{-2\pi i y v}dxdy \quad (1)$$

and the inverse Fourier transform of a two dimension function F(u,v) may be written as:

$$\Im^{-1}[F](x, y) = \int_{-\infty}^{\infty}\int_{-\infty}^{\infty} F(x, y)e^{2\pi i x u}e^{2\pi i y v}dudv. \quad (2)$$

An image is said to be in the spatial domain in that a pixel in the image refers to an intensity at a particular spatial location of some coordinate system. The result of a Fourier transform is said to be in the Fourier domain (or the frequency domain) in that a value in the Fourier transform refers to an intensity at a particular frequency. An inverse Fourier transform applied to an image in the Fourier domain results in an image in the spatial domain.

If it is assumed that F(u,v) is the Fourier transform of image I(x,y), that is F(u,v)=$\Im$[I](u,v), then the Fourier transform of image $I_2$(x,y)=I(x+$\Delta$x,y+$\Delta$y), which is a version of image I(x,y) that has been translated by ($\Delta$x,$\Delta$y), may be related to the Fourier transform of image I(x,y) through:

$$\Im[I_2](u,v)=F(u,v)e^{2\pi i u \Delta x}e^{2\pi i v \Delta y}. \quad (3)$$

This is the shift theorem of the Fourier transform that states that a translation in the spatial domain is equivalent to a linear phase shift in the Fourier domain.

The Fourier transform of a version of image I(x,y) that has been rotated by an angle $\vartheta$, and scaled by scale factor s, that is $I_3$(x,y)=I(s(x cos $\vartheta$+y sin $\vartheta$),s(-x sin $\vartheta$+y cos $\vartheta$)), is related to the Fourier transform F(u,v), by:

$$\Im[I_3](u, v) = \frac{1}{|s|}F\left(\frac{u\cos\vartheta + v\sin\vartheta}{s}, \frac{-u\sin\vartheta + v\cos\vartheta}{s}\right). \quad (4)$$

Equation (4) encapsulates the rotation and scale properties of the Fourier transform. It states that the Fourier transform of a rotated and scaled version of a two-dimensional function is the same as a scaled and rotated version of the Fourier transform of the two-dimensional function, up to a multiplicative constant. In particular, it states that the Fourier transform of the rotated and scaled version of the function is a rotated and scaled version of the Fourier transform. The scaling properties in the Fourier domain are opposite to those in the spatial domain—dilation in the spatial domain leads to contraction in the Fourier domain.

The rotation, scale and translation (RST) properties of the Fourier transform allow the construction of rotation, scale and translation invariant representations of an image. The Fourier-Mellin invariant descriptor (FMID) described in the "Background" section is such a RST invariant representation of an image. Given an image, $$I_4(x,y)=I(s(x\cos\vartheta+y\sin\vartheta)+\Delta_x, s(-x\sin\vartheta+y\cos\vartheta)+\Delta_y), \quad (5)$$

which is a rotated, scaled and translated version of image $I(x,y)$, the Fourier transform of image $I_4(x,y)$ is related to the Fourier transform of image $I(x,y)$ by, $$\Im[I_4](u,v) = \frac{1}{|s|}F\left(\frac{u\cos\vartheta+v\sin\vartheta}{s}, \frac{-u\sin\vartheta+v\cos\vartheta}{s}\right)e^{2\pi i u\Delta_x}e^{2\pi i v\Delta_y}. \quad (6)$$

The FMID of image $I_4(x,y)$ is calculated by firstly taking the magnitude of the Fourier transform of the image $I_4(x,y)$ as follows:

$$|\Im[I_4](u,v)| = \frac{1}{|s|}\left|F\left(\frac{u\cos\vartheta+v\sin\vartheta}{s}, \frac{-u\sin\vartheta+v\cos\vartheta}{s}\right)\right|. \quad (7)$$

The magnitude of the Fourier transform is a translation invariant, as it does not depend on a translation $(\Delta_x,\Delta_y)$ of the image. Transforming the magnitude of the Fourier transform into log-polar coordinates through the coordinate transformation $$\rho = \frac{1}{2}\log(u^2+v^2), \text{ and } \phi = \tan^{-1}\frac{v}{u}$$

then provides:

$$|\Im[I_4](\rho,\phi)| = \frac{1}{|s|}|F(\rho-\log s, \phi+\vartheta)| \quad (8)$$

This transforms the rotation and scale in the Fourier domain to a translation in the log-polar resampled domain. Finally the magnitude of the Fourier transform of the quantity in the log-polar resampled domain is taken to form the FMID as follows:

$$|\Im[|\Im[I_4](\rho,\phi)|]| = \frac{1}{|s|}|\Im[|F(\rho,\phi)|]|. \quad (9)$$

The FMID is independent of both the translation and the rotation, and depends only in absolute value on the scale. As such the FMID can be used as a matching key using cross correlation between two representations of a two-dimensional function, such as an image, that are related by a RST transform. In Equations (7) and (9) a Fourier domain translation invariant—the magnitude of the Fourier transform—is calculated.

As noted above, the FMID has a number of drawbacks when it is used as an invariant descriptor of an image. The reason for this is based on the fact that a large proportion of the visual content of an image, when transformed to the Fourier domain, is contained within the Fourier phase. This is evidenced by, when the Fourier magnitude of one image is combined with the Fourier phase of another image, the resulting image typically looks like the image from which the Fourier phase was taken. Given that the Fourier phase encodes a lot of the image content, the fact that the FMID removes all the Fourier phase of the input image by taking a magnitude and further removing the Fourier phase of the log-polar transform means that the FMID has discarded much of the information about the image that a human finds perceptually relevant.

This is of particular relevance for images of text documents, which consist largely of edges. Edges in the Fourier domain are characterised by what is known as coherent phase, where the phase of the frequency components that represent the edge have a particular relationship that ensures that each frequency component that is present in the edge lies at the position of the edge. Removing the Fourier phase from an edge destroys the edge, and thus removing the Fourier phase from an image of a text document destroys the ability to discriminate that image from that of other similar text documents based on fine text details. It is for these reasons that the FMID is not a good invariant descriptor for images of text documents.

To demonstrate that the discriminating power of descriptors based on the rotation, scale and shift properties of the Fourier transform may be improved beyond what the FMID provides, it is necessary to introduce the concept of translation invariant phase. This is the part of the Fourier phase that is invariant to translation. The translation invariant phase may be used in the generation of an invariant descriptor, either explicitly or implicitly, thereby enhancing its discrimination, particularly for images of text documents.

As noted above, the shift theorem of the Fourier transform states that a shift in the spatial domain is the same as multiplication by a linear phase factor in the Fourier domain. If the Fourier transform of image $I(x,y)$ is written as $F(u,v)=|F(u,v)|e^{i\Psi(u,v)}$, that is in terms of its Fourier magnitude $|F(u,v)|$ and its Fourier phase $\Psi(u,v)$, then the shift theorem may be written as:

$$\Im[I_2](u,v)=|F(u,v)|e^{i\Psi(u,v)}e^{2\pi i u\Delta x}e^{2\pi i v\Delta y}. \quad (10)$$

That is, the Fourier phase of the shifted image is $$\Psi(u,v)+2\pi(u\Delta x+v\Delta y). \quad (11)$$

By then taking the Laplacian of the Fourier phase $\Psi(u,v)$, the result is independent of the translation of the initial image $I(x,y)$:

$$\left(\frac{\partial^2}{\partial u^2}+\frac{\partial^2}{\partial v^2}\right)(\Psi(u,v)+2\pi(u\Delta x+v\Delta y)) = \left(\frac{\partial^2}{\partial u^2}+\frac{\partial^2}{\partial v^2}\right)\Psi(u,v) \quad (12)$$

Equation (12) shows that the Laplacian of the Fourier phase is an invariant to translation. The Laplacian of the phase as used in Equation (12) is calculated modulo $2\pi$ because the Fourier phase $\Psi(u,v)$ is limited to the range $(0,2\pi)$. If the Laplacian of the Fourier phase $\Psi(u,v)$ is retained in any step where the translation invariant is generated, then the discriminating power of the invariant descriptor that is generated is greatly enhanced.

Other operators acting on the Fourier transform also retain some of the translation invariant Fourier phase $\Psi(u,v)$, such as the Laplacian of the logarithm of the Fourier transform, or operators such as:

$$\left(\left(\frac{\partial^2}{\partial u^2}+\frac{\partial^2}{\partial v^2}\right)+i\left(\frac{\partial^2}{\partial u\partial v}+\frac{\partial^2}{\partial v\partial u}\right)\right)(\log F(u,v)) \text{ and} \quad (13)$$

-continued $$\left(\left(\frac{\partial^2}{\partial u^2}-\frac{\partial^2}{\partial v^2}\right)+i\left(\frac{\partial^2}{\partial u\partial v}-\frac{\partial^2}{\partial v\partial u}\right)\right)(\log F(u,v)), \quad (14)$$

where the logarithm of a complex number such as a Fourier transform element is defined as:

$$\log F(u,v)=\log |F(u,v)|+i\Psi(u,v), \quad (15)$$

where $\Psi(u,v)=\text{Arg}(F(u,v))$.

As these operators also retain some of the translation invariant Fourier phase $\Psi(u,v)$, using these operators in constructing the invariant descriptor will also enhance its discriminating power.

Operators that act on the Fourier phase $\Psi(u,v)$ directly to produce translation invariant descriptors that contain some of the translation invariant Fourier phase $\Psi(u,v)$ may be termed explicit methods of retaining the translation invariant Fourier phase. There are also implicit methods that may be used to retain some of the Fourier phase $\Psi(u,v)$ information that would otherwise be discarded when constructing an invariant descriptor, such as the FMID. These implicit methods involve non-linearly filtering the image $I(x,y)$ to move some of the invariant Fourier phase $\Psi(u,v)$ out of the Fourier domain and embed it in the spatial domain in such a way that it becomes part of the Fourier magnitude after Fourier transforming. Such methods also increase the discriminating power of the invariant descriptor.

An example of such a non-linear filtering involves constructing a complex image $C(x,y)$, that is an image with both a real and imaginary part, from the real valued image $I(x,y)$. This may be done by convolving image $I(x,y)$ with a complex kernel function $k(x,y)$, and taking the phase of this convolution and combining it with image $I(x,y)$. For instance, if a complex kernel function $k(x,y)$ is used that has the Fourier transform $K(u,v)=\Im[k]$ of:

$$K(u,v)=\frac{u+iv}{|u+iv|}, \quad (16)$$

then constructing the complex image is given by $$C(x,y)=I(x,y)\frac{\left(I(x,y)*\Im^{-1}\left[\frac{u+iv}{|u+iv|}\right]\right)}{\left|I(x,y)*\Im^{-1}\left[\frac{u+iv}{|u+iv|}\right]\right|}, \quad (17)$$

where * denotes convolution. This leads to a complex valued image $C(x,y)$ that has some of the translation invariant phase $\Psi(u,v)$ of the original image $I(x,y)$ present in its complex phase in the spatial domain. Furthermore, because the kernel function $k(x,y)$ used in the convolution operation has no preferential direction or scale, the invariant descriptors generated from the complex image $C(x,y)$, rather than the original image $I(x,y)$, are still invariant to rotation, and scale, up to a multiplicative complex constant. Likewise, as the same convolution kernel is used at each point in the image, the invariant descriptors derived from complex image $C(x,y)$ will also remain translation invariant. Performing non-linear filtering with kernels that have no preferential direction or scale leads to an improvement in the discriminating power of the invariant descriptor.

Other complex kernel functions may be used in generating the complex valued image from the real valued image. Another such kernel function is the complex gradient k'(x,y), which has a Fourier transform $K'=\Im(k')$ of:

$$K'(u,v)=u+iv. \quad (18)$$

Other non-linear operators may also be used in generating the complex valued image $C(x,y)$ from the real valued image $I(x,y)$. Another such non-linear operator is the energy operator, which may be described by:

$$E[I]=ID^2I-(DI)^2, \quad (19)$$

where D is the derivative operator defined by:

$$D=\frac{\partial}{\partial x}+i\frac{\partial}{\partial y}. \quad (20)$$

Another alternative non-linear operator that may be applied to produce the complex image $C(x,y)$ is the uni-modular energy operator:

$$E'[I]=ID'^2I-(D'I)^2, \quad (21)$$

where D' is the uni-modular derivative operator. The uni-modular derivative operator D' may be described as an operation in the Fourier domain as follows:

$$D'(I)=\Im^{-1}\left[\Im[I]\frac{u+iv}{|u+iv|}\right]. \quad (22)$$

Given the advantages demonstrated in retaining the translation invariant phase information, both explicitly and implicitly, in the RST invariant generation process, this improved RST invariant is used to generate an image key in a document database system described below.

Figure 2A:
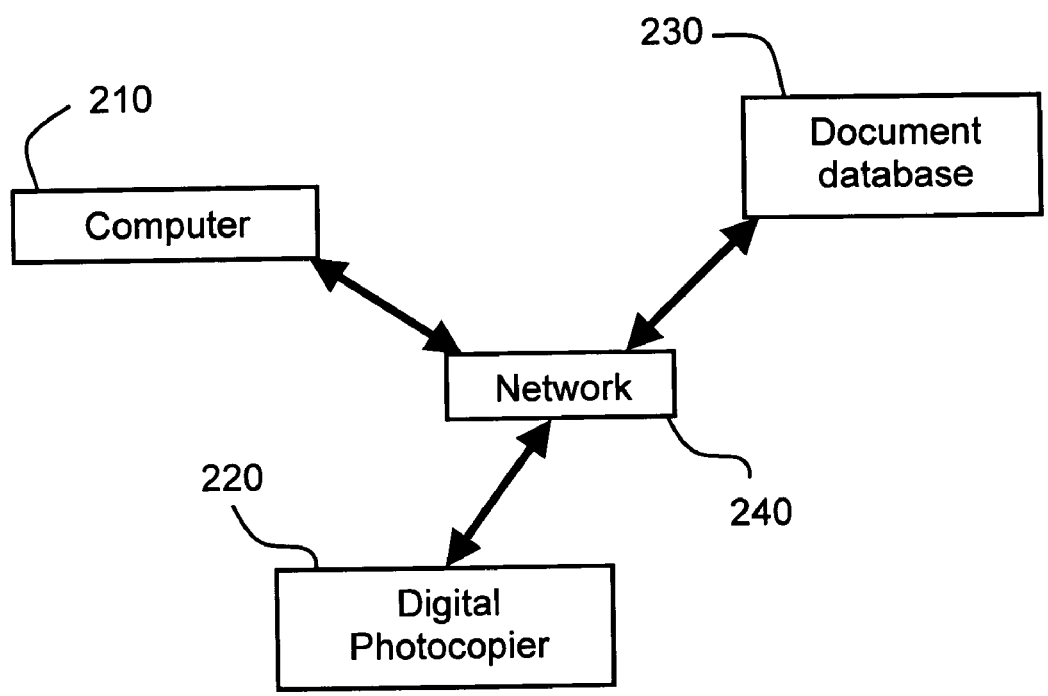
FIG. 2A is a schematic block diagram of document database system.

In particular, the preferred embodiment of the invention is described in terms of an office workflow environment, such as that depicted in FIG. 2, where a user prints a document from a desktop computer 210 at one moment in time, with the document then being stored into a document database 230 via a network 240. Then, at a later moment in time, further copies of the document are generated using a digital photocopier 220 also attached to the document database 230 via the network 240. In the above the digital photocopier 220 acts as a networked printer and a scanner. Documents are indexed in the document database 230 by an image key generated using the improved RST invariant described above.

Figure 2B:
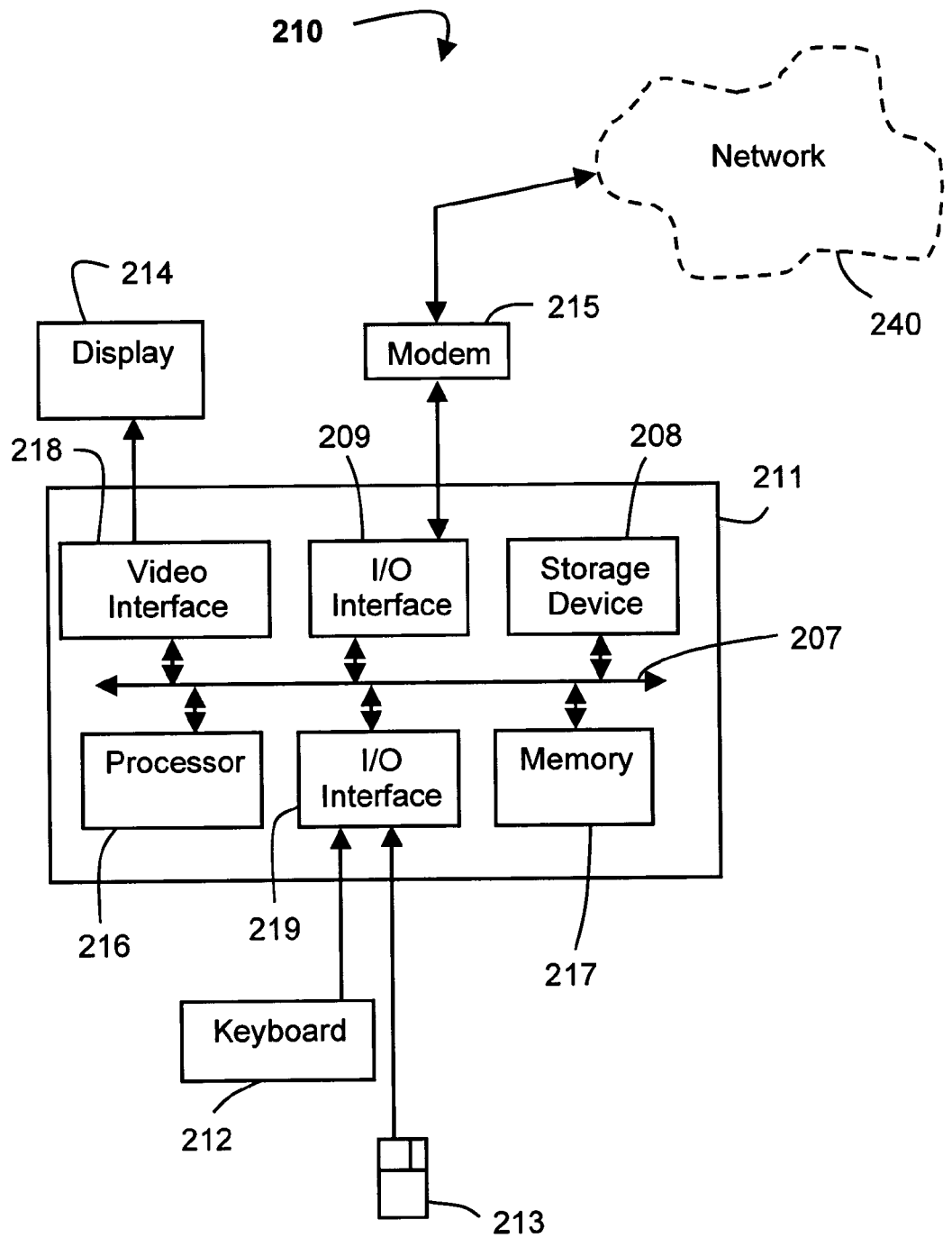
FIG. 2B shows a schematic block diagram of a computer in the document database system of FIG. 2A.
Figure 3:
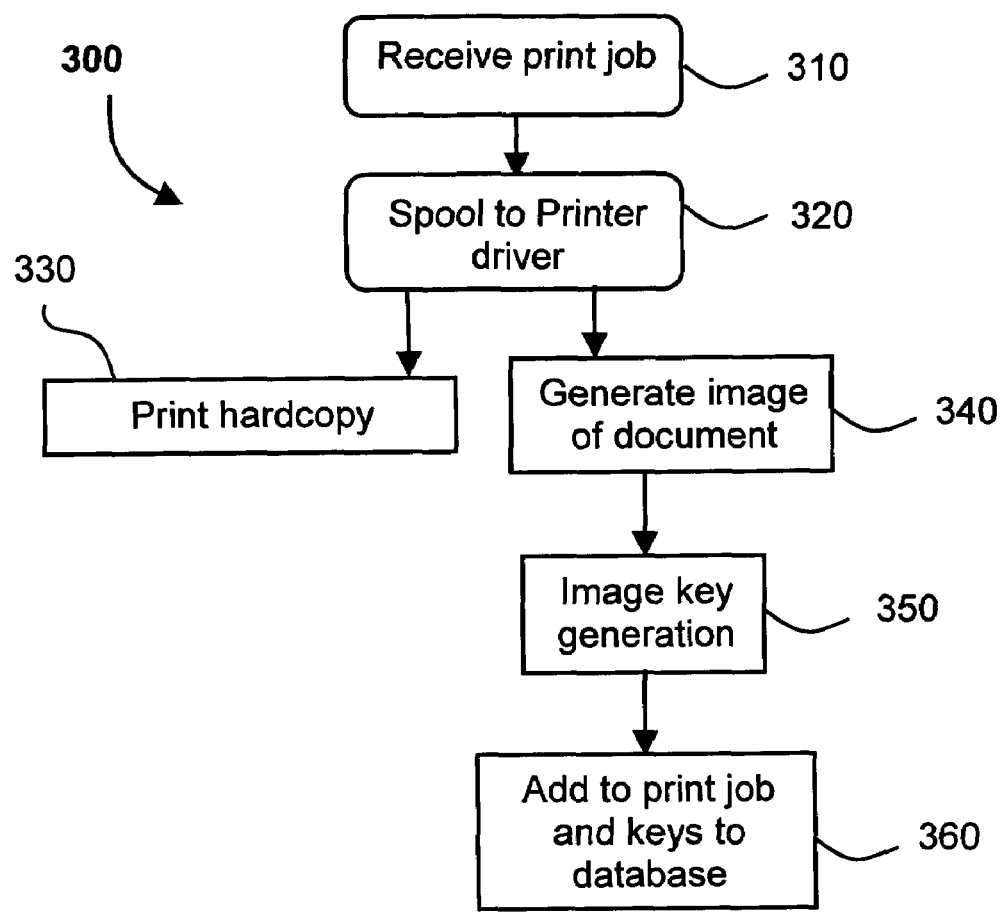
FIG. 3 is a flow diagram of a process of storing a print job and associated image keys in a database.

FIG. 3 shows a flow diagram of a process 300 performed in the computer 210 that occurs when the user first prints the document. FIG. 2B shows a schematic block diagram of the computer 210 wherein the process 300 may be implemented as software executing within the computer 210. The software may be stored in a computer readable medium, including the storage devices described below, for example. The software is loaded into the computer 210 from the computer readable medium, and then executed by the computer 210. A computer readable medium having such software or computer program recorded on it is a computer program product.

The computer 210 is formed by a computer module 211, input devices such as a keyboard 212 and mouse 213, and output devices including a display device 214. A Modulator-Demodulator (Modem) transceiver device 215 is used by the computer module 211 for communicating to and from the network 240.

The computer module 211 typically includes at least one processor unit 216, and a memory unit 217. The module 211 also includes a number of input/output (I/O) interfaces including an video interface 218 that couples to the video display 214, an I/O interface 219 for the keyboard 212 and mouse 213, and an interface 209 for the modem 215. A storage device 208 is also provided, and typically includes a hard disk drive, a floppy disk drive and a CD-ROM drive. The components 208, 209, and 216 to 219 of the computer module 211 typically communicate via an interconnected bus 207 and in a manner which results in a conventional mode of operation of the computer 210 known to those in the relevant art.

Referring again to FIG. 3, process 300 starts in step 310 where the computer 210 receives a print job. The print job is typically generated by the user using an application such as a word processing application. The print job is then in step 320 spooled to a printer driver. The printer driver passes the job on to the digital photocopier 220 for printing a hardcopy in step 330.

The printer driver also generates an image of each page in the print job in step 340. The luminance channel of each image is converted to an image key in step 350. Hence, each page of the document has an associated key. Finally, in step 360, these image keys and the print job are passed over the network 240 to the document database 230 for storage.

Figure 2C:
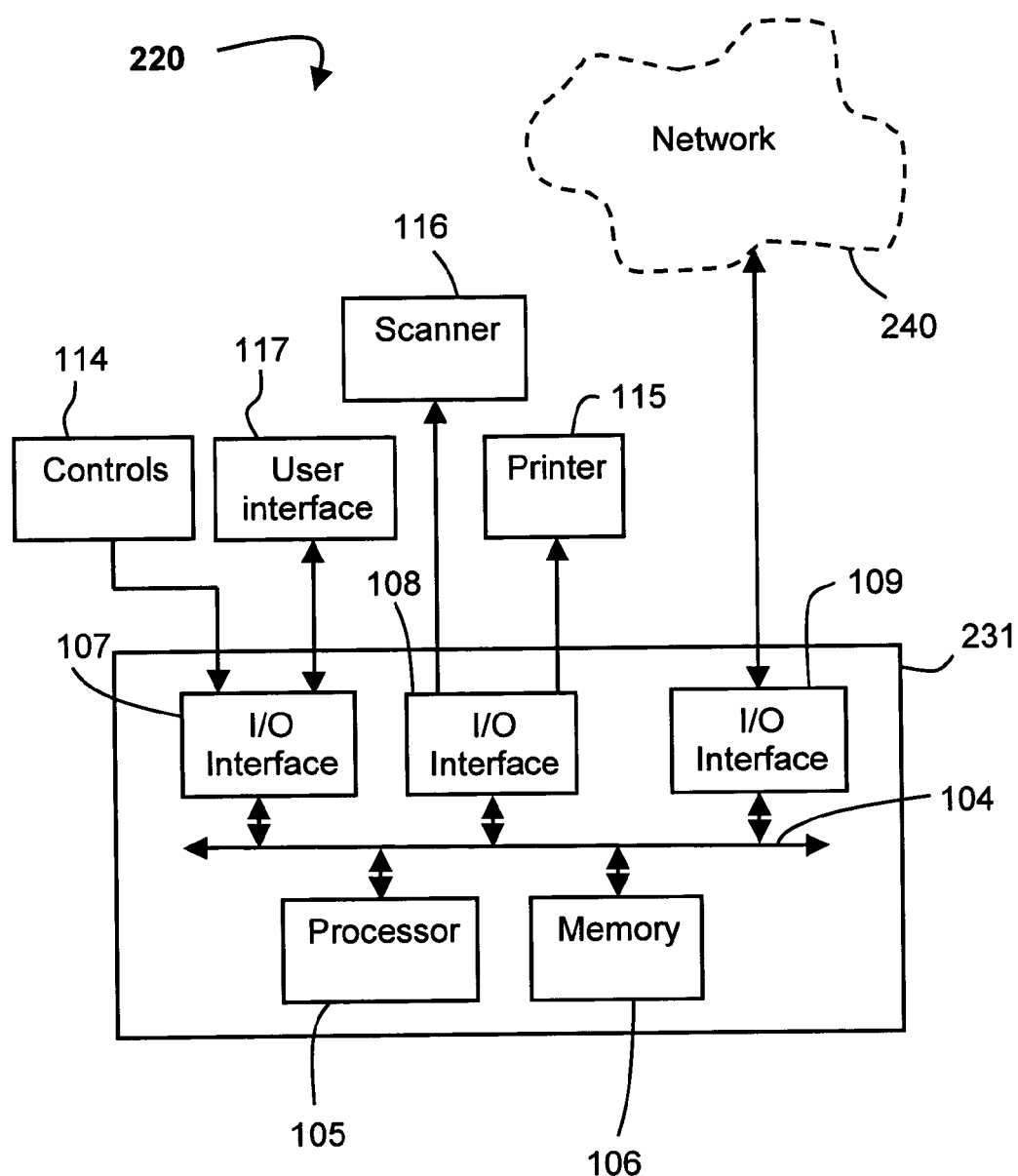
FIG. 2C shows a schematic block diagram of a digital photocopier in the document database system of FIG. 2A.
Figure 4:
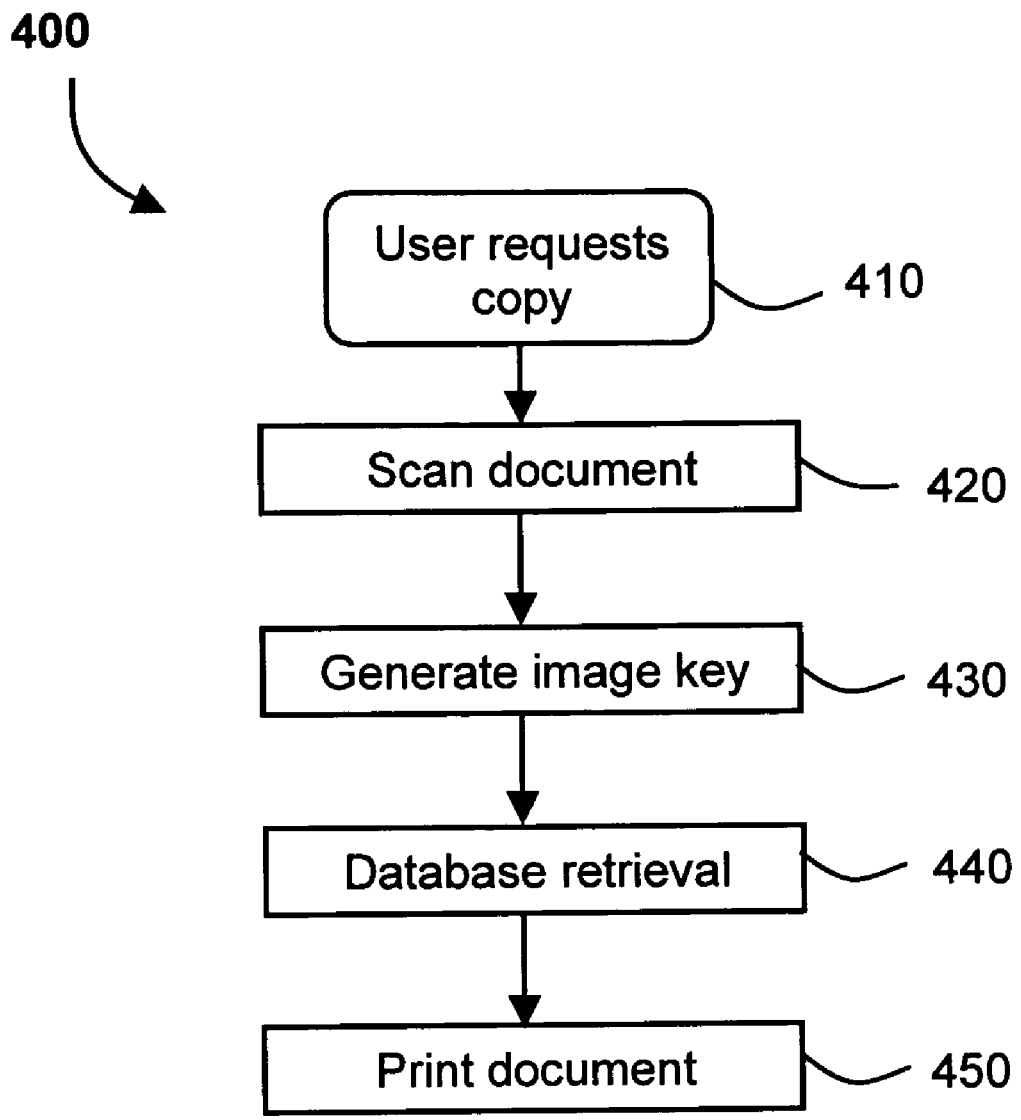
FIG. 4 is a flow diagram of a process of retrieving a print job from the database using a scan as input.

FIG. 4 shows a flow diagram of a process 400 occurring when the user generates a further copy of the document. Process 400 is performed the digital photocopier 220, an in particular performed through software executing within a processor of the photocopier 220. FIG. 2C shows a schematic block diagram of the digital photocopier 220. The digital photocopier 220 is formed by a computer module 231, a printer 232 for providing printed paper as output, a scanner 233 for receiving paper as input and digitising any images formed on the paper into an electronic format. The photocopier 220 is further formed by a user interface 234 and controls 235. The user interface 234 typically includes a display for displaying information to the user in textual or graphical form, and a touch screen for receiving commands from the user.

The computer module 231 typically includes at least one processor unit 236, a memory unit 237, and a number of input/output (I/O) interfaces, including an I/O interface 238 for the user interface 234 and controls 235, an I/O interface 239 for the printer 232 and scanner 233, and an interface 241 for connecting the computer module 231 to the network 240. The components 236 to 239 and 241 of the computer module 231 communicate via interconnected bus 242 in a manner known to those in the relevant art.

The software controlling the operation of the digital photocopier 220 is resident in the memory 237, and manages the interaction with the scanner 116 and the printer 115, the user interface 117 and communications over the network 240.

Referring again to FIG. 4, process 400 starts in step 410 when the user places a page of the document on the digital photocopier 220 and requests via the user interface of the digital photocopier 220 that a new copy of the document from which the page was taken be generated. In step 420 the photocopier 220 performs a scan of the page presented by the user in step 410, thereby generating an image of the page of the document. This image is converted to an image key in step 430, with step 430 being identical to step 350 in FIG. 3. The image key is then looked up in the document database 230 in step 440 to identify a corresponding document. If a corresponding document is found in the database 230, the print job is retrieved by the digital photocopier 220 over the network 240 and reprinted in step 450.

Figure 5:
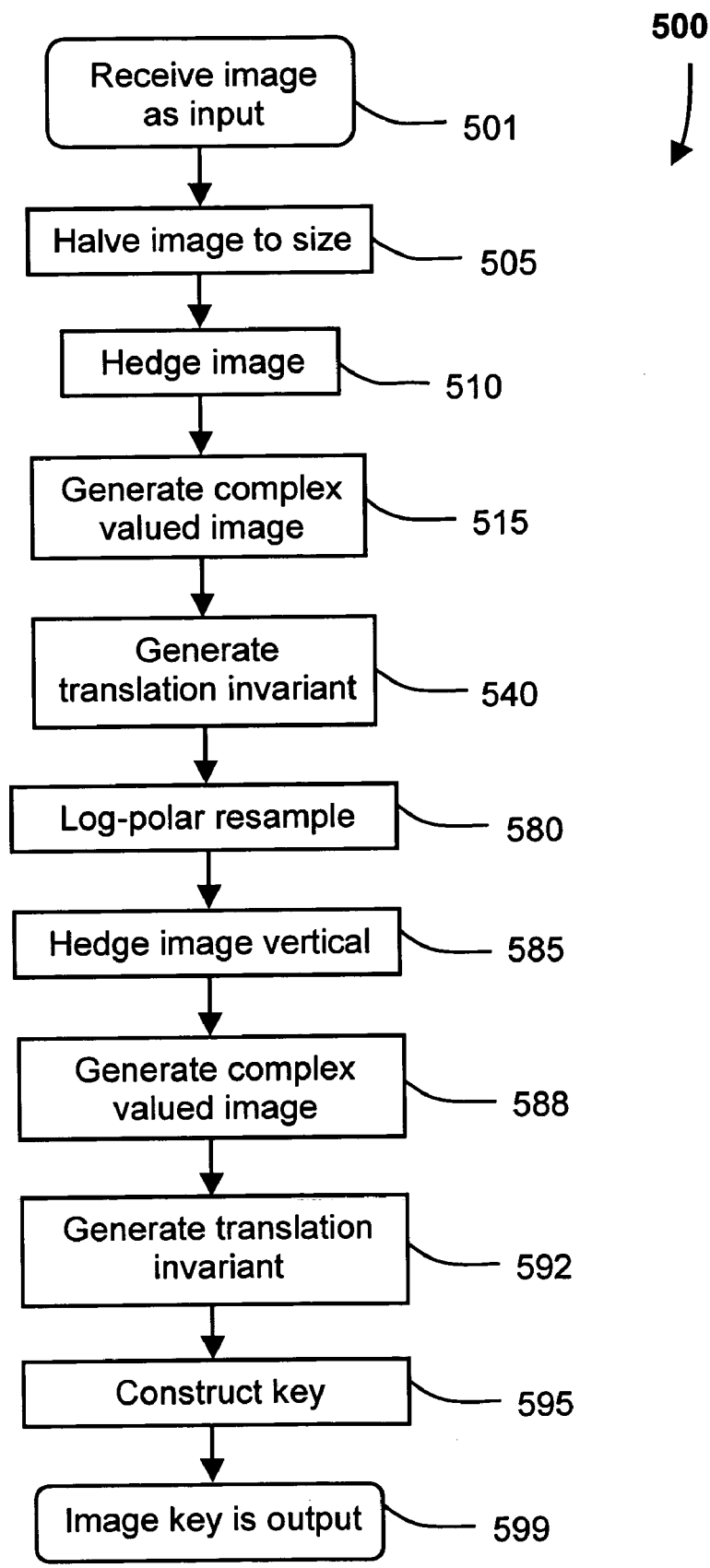
FIG. 5 is a flow diagram of a method of generating an image key of an image according to an embodiment of the present invention, with the image key being substantially invariant to transformations including rotation, scale and translation.

The preferred embodiment of an image key generation process 500 used in steps 350 and 430 is now described in more detail with respect to FIG. 5 where a flow diagram of the image key generation process 500 is shown. This process 500 receives an image 501 as input. It is assumed that in this image 501 the pixel values are single channel values represented in either fixed precision or floating-point arithmetic. This image 501 may be supplied by an image capture device, such as a scanner (or camera) of the photocopier 220 in the case of step 430, may be generated as the result of a rasterization process of a page description language as in the case of step 350, may be received over the network 240, or have some other source.

In step 505 the input image 501 is halved in size until either the width or height cannot be halved without making it smaller than a predetermined SIZE_LIM pixels, where the preferred value for SIZE_LIM is 512. Image halving methods are well known in the art, such as B-spline fitting followed by decimation. With the image reduced in size, the width of the image in pixels is labelled as M and the height of the image in pixels is labelled as N.

In step 510 the output of the image-halving step 505 is "hedged". Hedging means that the image is multiplied by a windowing function that applies a unity function to the majority of the image, but smoothly transitions to zero at the boundaries of the image. The size of the hedge specifies the maximum distance from the boundaries of the image that pixels should be modified from their original values. The preferred hedging size is W=24 pixels. The hedging function used in this embodiment is specified in terms of the factor by which each pixel a distance of d from the boundary is to be multiplied by. This factor is given by:

$$h(d) = \begin{cases} \frac{1}{2}\left(1 - \cos\left(\frac{d\pi}{W}\right)\right), & d < W \\ 1, & d > W \end{cases} \quad (23)$$

The hedged image output from step 510 is used to generate a complex valued image in step 515. That is, the image is processed in such a way that the image input to step 515, which has real valued pixels only, is converted to an image with complex valued pixels. This complex valued image is used to generate a translation invariant in step 540.

This translation invariant is then transformed in step 580 such that rotation and/or scale in the translation invariant is transformed into a translation. In the preferred implementation this transform is achieved through log-polar resampling.

In order to resample to the log-polar domain, it is necessary to specify a resolution within the log-polar domain. As the halved image is M pixels wide by N pixels high, the horizontal coordinate x varies between 0 and M−1, while the vertical y-coordinate varies between 0 and N−1, and the centre of the translation invariant representation of the image generated in step 540 is located at $(c_x, c_y)$=(floor(N/2), floor(M/2)). Log-polar resampling to an image having dimensions P pixels by Q pixels in log-polar space is performed relative to this centre. To avoid a singularity at the origin, it is necessary to ignore a disc of radius $r_{min}$ pixels around the centres of the translation invariant representation. While ignoring this disc, a point (x,y) in the log-polar plane is determined by interpolating the translation invariant image at the point (x,y) as follows:

$$x = c_x + \cos\frac{2\pi j}{Q} r_{min} e^{ai} \quad (24)$$

$$y = c_y + \sin\frac{2\pi j}{Q} r_{min} e^{ai}, \text{ wherein}$$

$$a = \frac{\log r_{max}/r_{min}}{P-1}, \text{ and} \quad (25)$$

$$r_{max} = \max\{M/2, N/2\}, \quad (26)$$

denotes the maximum radius that the log-polar sampling of the translation invariant image extends to. Preferred values of the constants are $r_{min}=0.124 r_{max}$, P=96, and Q=240.

The preferred interpolation method of log-polar resampling the translation invariant representation of the image is bicubic interpolation.

The log-polar resampled translation invariant of the image is hedged for vertical edges in step 585. In this hedging step the same hedging function is used as in step 510, but the hedging function is only applied to pixels within distance $W_2=7$ pixels of the left and right boundaries of the log-polar resampled translation invariant.

The result of the hedging step 585 is used in step 588 to generate a further complex image, and a further translation invariant is generated in step 592. This further translation invariant, which consists of a complex image of 96 by 240 elements, is used in step 595 to construct an output key 599. The translation invariant generated in step 592 may be used as the document indexing key directly. However, the result of step 592 is a complex image 96 pixels wide by 240 pixels high. Also, this translation invariant image is Hermitian, so only the upper half of the image needs to be used to construct the key, but even this 96 pixel by 120 pixel image is 11520 elements in length, which makes it too long for many applications.

The key construction method used in step 595 is preferably to halve the upper half of the 96 by 240 complex image generated in step 592 until the image is 24 by 30 elements in size, and to store the phase of these elements in scan-wise order in a vector of 720 elements. Other methods of constructing a key from the invariant descriptor may involve using all of the elements of the upper half of the invariant as the key, or forming a multi-resolution representation of the invariant descriptor for use as a key, or selecting a subset of the invariant descriptor pixels for use as the key.

Referring again to step 440 in FIG. 4, two image keys, $K^{(1)}$ and $K^{(2)}$, may be compared through cross-correlation. The similarity of the two keys is given by $$S(K^{(1)}, K^{(2)}) = \frac{1}{720}\sum_{i=1}^{720}\cos(K_i^{(1)} - K_i^{(2)}), \quad (27)$$

where $K_i^{(1)}$ is the i-th element of image key $K^{(1)}$. Two similar keys will have a correlation value of close to 1 while dissimilar keys will have a correlation value of close to 0.

Figure 6:
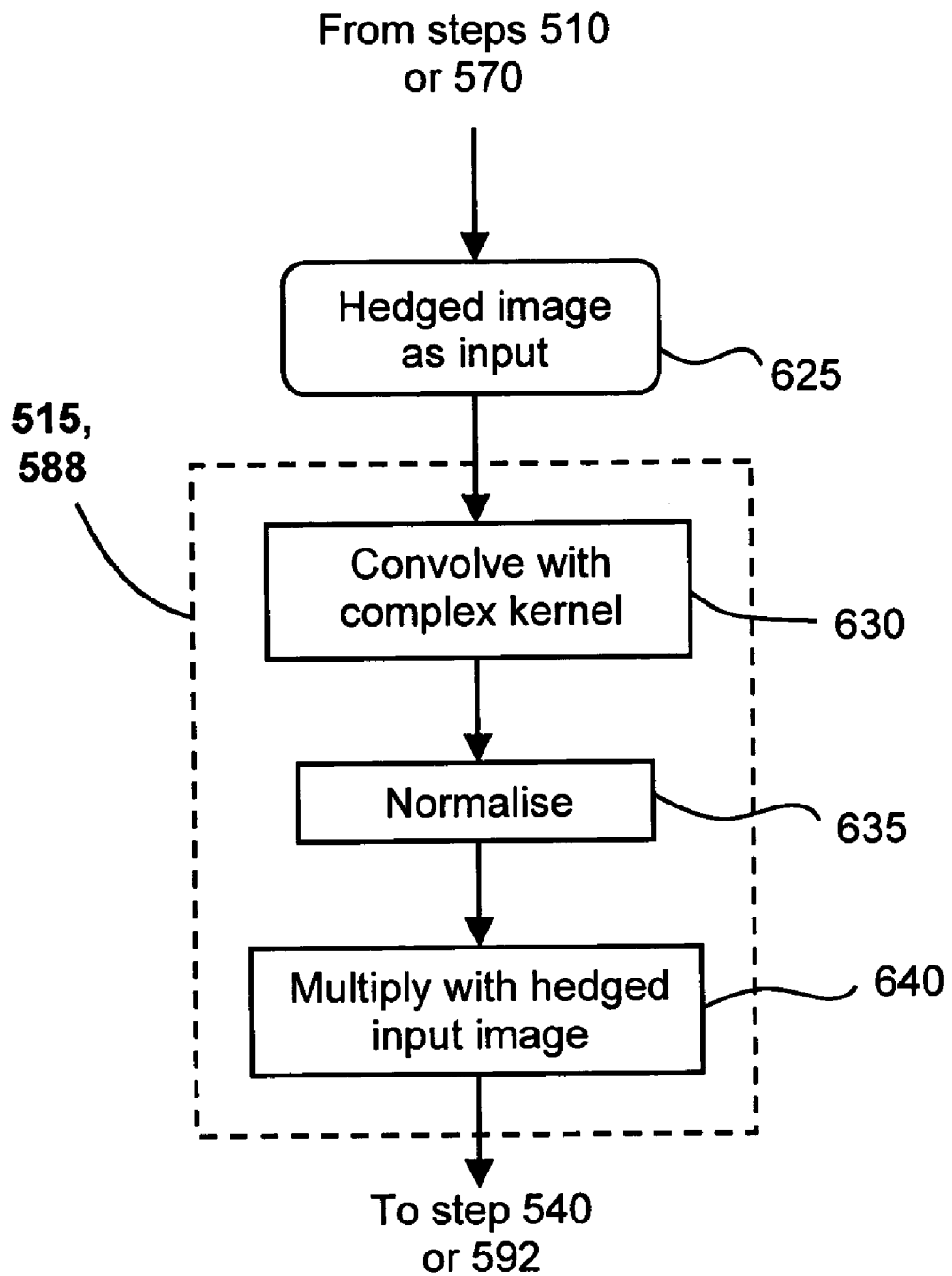
FIGS. 6 and 7 show more detailed flow diagrams of alternate implementations of forming a complex image from an image with real values.

FIG. 6 shows a more detailed flow diagram of a first implementation of sub-steps 515 and 588 (FIG. 5) where a complex valued image is formed from the hedge input image, 625, which is produced either in step 512 or 570. In sub-step 630 the hedge input image 625, which is denoted I(x,y), is convolved with a complex kernel function k. The convolution may be performed in the spatial domain or through the standard technique of multiplication in the Fourier domain.

The complex kernel function k used in sub-step 630 is that with a Fourier transform $K=\Im(k)$ given by Equation (16). An alternative complex kernel function k' that may be used in sub-step 630 is one with a Fourier transform $K'=\Im(k')$ given by Equation (18).

The result of the convolution ((I*k), where * denotes convolution,) is normalised in sub-step 635 to have unit magnitude, $$\Gamma = \frac{I*k}{|I*k|}, \quad (28)$$

Finally the normalised result of the convolution $\Gamma$ is multiplied with the hedge input image I(x,y) in sub-step 640 to form the complex image Ĩ(x,y). The complex image Ĩ(x,y) has the same magnitude as the original image I(x,y), but each point in the complex image Ĩ(x,y) has an associated phase generated by the convolution in sub-step 630. For the kernel functions k and k', the associated phase encodes a quantity related to the gradient direction of the image I(x,y).

Figure 7:
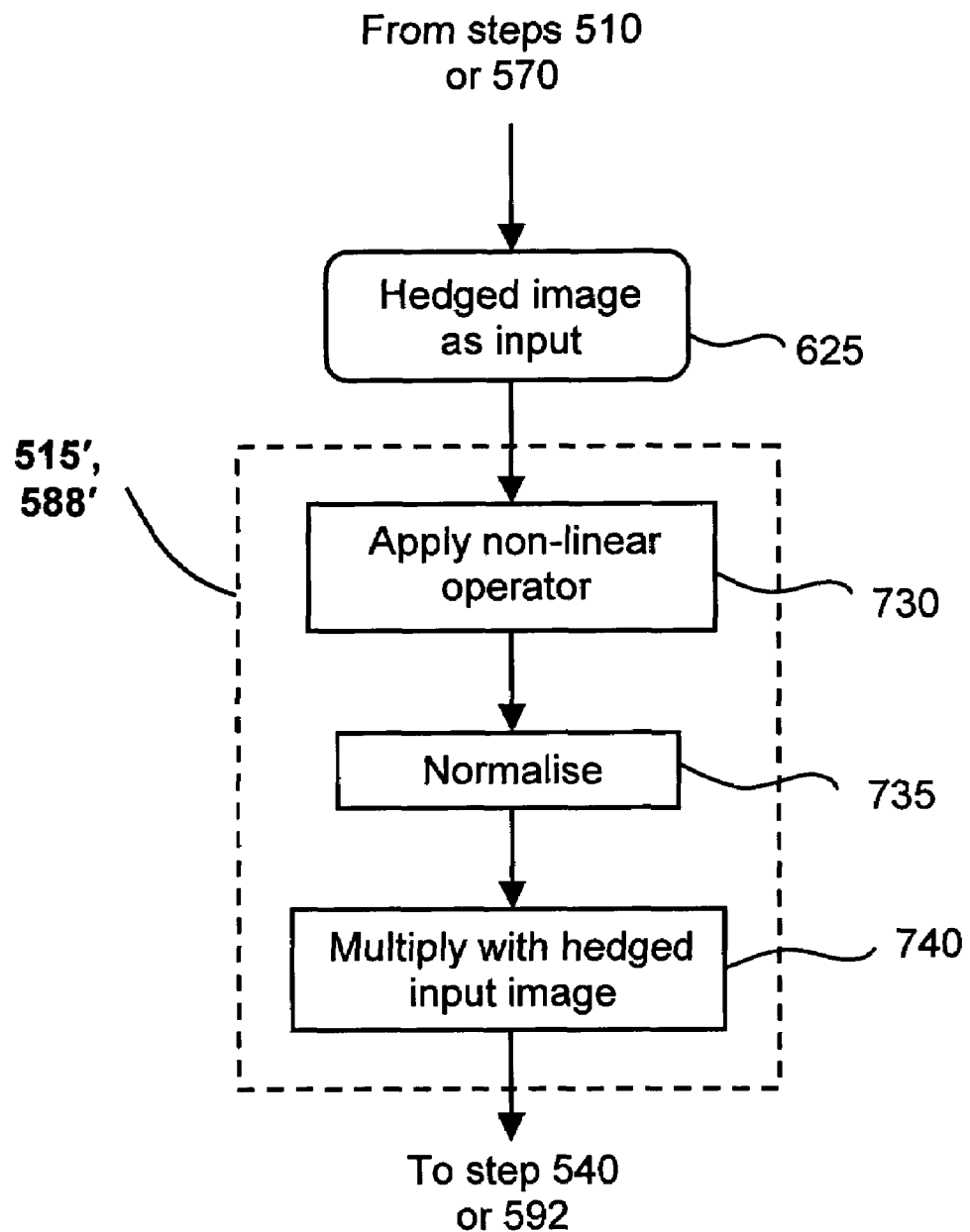

FIG. 7 shows a more detailed flow diagram of a second (alternate) implementation of sub-steps 515 and 588 (FIG. 5) where the complex image Ĩ(x,y) is formed from the hedge image I(x,y). In sub-step 730 a non-linear operator is applied to the image I(x,y) to produce a complex image.

The non-linear operator applied in sub-step 420 is the energy operator, which may be described by Equation (19). An alternative non-linear operator that may be applied in sub-step 420 to produce the complex image is the uni-modular energy operator given by Equation (21).

Preferably, in sub-step 735 which follows sub-step 730, the result of the non-linear operator applied to image I(x,y) is normalised to unit modulus, and the result of this normalisation is multiplied by the original hedged image I(x,y) in sub-step 740 to form the complex image Ĩ(x,y). Alternatively, the result of the non-linear operator applied to image I(x,y), hence the output of sub-step 730, may be used as the complex image Ĩ(x,y).

Figure 8:
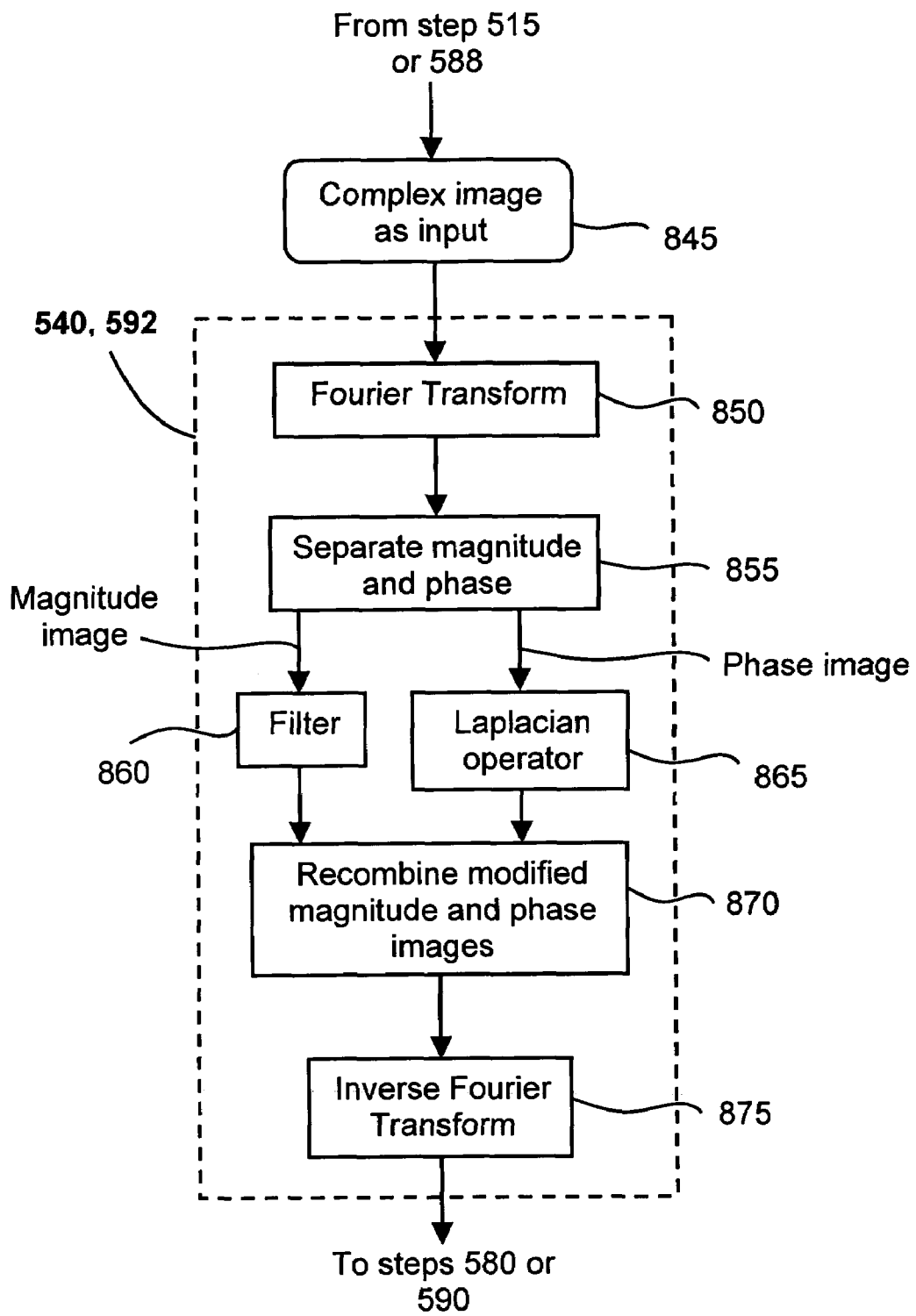
FIGS. 8 and 9 show more detailed flow diagrams of alternate implementations of forming a representation that is translation invariant in the spatial domain of an image.

FIG. 8 shows a more detailed flow diagram of a first implementation of sub-steps 540 and 592 (FIG. 5) in which a translation invariant representation of the complex image 845 is generated. Sub-steps 540 and 592 receive as input the complex image Ĩ(x,y) formed in sub-step 515. The complex image Ĩ(x,y) is first Fourier transformed in sub-step 850 thereby producing an image consisting of complex values. This image is separated in sub-step 855 into two separate images, those being a magnitude image containing the magnitudes of the complex values of the Fourier transform, and a phase image containing the phases of the complex values of the Fourier transform. In sub-step 860 a function is applied to the magnitude image, where in the preferred implementation the magnitude image is multiplied by a ramp function of the form:

$$f(u,v) = \sqrt{u^2+v^2}, \quad (29)$$

to perform high-pass filtering of the magnitude image. Alternately, any function being commutative within a constant to rotation and scale may be applied to the magnitude part of the image, e.g.

$$T(f(x,y)) = cf(T(x,y)) \quad (30)$$

where T represents a rotation and scale transformation, $f$ is a function, and c is a constant. In sub-step 865 an operator is applied to the phase image to take the second or higher derivative of the phase, which is a translation invariant. In the preferred implementation the Laplacian operator is used.

Sub-steps 540 and 592 continues to sub-step 870 where the modified magnitude image produced from sub-step 860, and the result of taking the Laplacian of the phase image produced from sub-step 865 are combined through:

$$|F|+iA\nabla^2\phi, \tag{31}$$

wherein $|F|$ is the modified magnitude of the Fourier transform of the complex image $\tilde{I}(x,y)$, $\nabla^2\phi$ is the Laplacian of the phase image of the Fourier transform, and A is a scaling constant set to:

$$A=\max(|F|)/\pi. \tag{32}$$

The scaling constant A ensures that the recombined Fourier magnitude and phase information are roughly of equal magnitude.

The result of combining the modified magnitude image and the result of taking the Laplacian of the phase image is then inverse Fourier transformed in sub-step 875, thereby producing the representation $T(x,y)$ that is translation invariant in the spatial domain.

Figure 9:
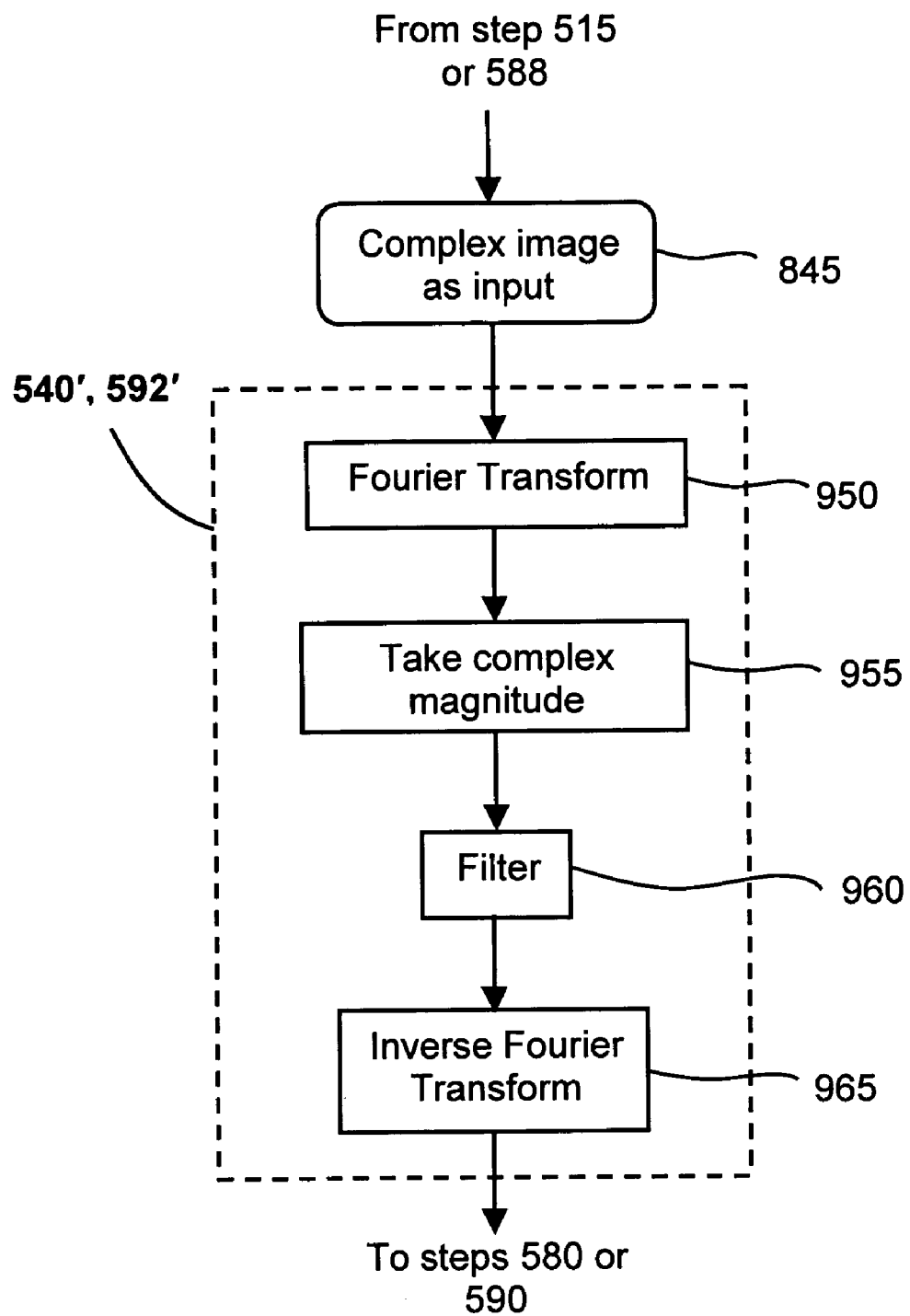

FIG. 9 shows a more detailed flow diagram of a second (alternate) implementation of sub-steps 540 and 592 (FIG. 5) in which a translation invariant representation of the complex image 845 is generated. In this alternate implementation the complex image $\tilde{I}(x,y)$ is first Fourier transformed in sub-step 950 thereby producing an image consisting of complex values. This complex magnitude of this image is taken in step 955 and in the preferred implementation this magnitude image is multiplied by a ramp function in step 960 to perform high-pass filtering of the magnitude image. The result of the filtering step 960 is then inverse Fourier transformed in sub-step 965, thereby producing the representation $T(x,y)$ that is translation invariant in the spatial domain.

Other translation invariants of the Fourier magnitude and phase may be used in place of sub-steps 860, 865 and 955, such as:

the modulus squared of the Fourier magnitude;
the logarithm of the Fourier magnitude;
the Laplacian of the logarithm of the Fourier transform; or
operators such as those in Equations (13) and (14).

The preferred embodiment of the invention has been outlined above. As has been noted in the description, there are various optional parts of the processing and different implementations of several of the steps are possible. Which exact implementation and which combination of steps is chosen are dependent on the conditions under which the embodiment is operating. In particular, if the embodiment is operating in an environment of restricted computing resources, for example in an embedded processing system in the photocopier 220 as opposed to on the processor of the general purpose computer 210 or server, then it is preferable to use a configuration of the invention that requires less computing resources.

In a computing environment where computing resources are not restricted then it is preferable to use both the complex image generation step outlined in FIG. 6 and the translation invariant generation step outlined in FIG. 8. In a computing environment where computing resources are limited it is preferable to use the complex image generation step outlined in FIG. 6 and the translation invariant generation step outlined in FIG. 9. Other combinations of choices between the two complex image generation steps outlined in FIGS. 6 and 7 and the two translation invariant generation steps in FIGS. 8 and 9 may also be useful in other circumstances. Furthermore, different choices may be made for steps 535 and 588 and steps 540 and 592 depending on the requirements of the system. A further variation would be to exclude the complex image generation step from the procedure outlined in FIG. 5, instead using the hedged halved image as input to the translation invariant generation procedure. In itself this modified procedure substantially improves the discriminating properties of the invariant descriptor over the prior art, though not as much as using the full procedure outlined above.

The preferred embodiment of the invention outlined above operates on the luminance channel of the input image. It is also possible to form invariant descriptors from other channels of the input image, such as colour channels, or hue, and saturation channels.

We claim:

1. A method of generating a matching key for an image with said matching key being substantially invariant to rotation, scale and translation, said method comprising the steps of:

forming a spatial domain representation of said image that is substantially invariant to translation of said image;

transforming at least one of rotation and scaling of said image in said spatial domain representation into translation to form a transformed image; and forming a spatial domain representation of said transformed image that is substantially invariant to translation of said transformed image, said spatial domain representation of said transformed image being said matching key from said image, wherein the step of forming said spatial domain representation of said image comprises the sub-steps of:

performing a Fourier transform of said image to form a Fourier transformed image;

performing a function on the magnitude component of said Fourier transformed image to form an altered Fourier transformed image, said function being commutative within a constant to rotation and scale; and performing an inverse Fourier transform on said altered Fourier transformed image to form said spatial domain representation.

2. The method as claimed in claim 1, wherein the transforming step is achieved through log-polar resampling said spatial domain representation.

3. A method of generating a matching key for an image with said matching key being substantially invariant to rotation, scale and translation, said method comprising the steps of:

forming a spatial domain representation of said image that is substantially invariant to translation of said image;

transforming at least one of rotation and scaling of said image in said spatial domain representation into translation to form a transformed image; and forming a spatial domain representation of said transformed image that is substantially invariant to translation of said transformed image, said spatial domain representation of said transformed image being said matching key from said image, wherein the step of forming said spatial domain representation of said image comprises the sub-steps of:

performing a Fourier transform of said image to form a Fourier transformed image;

performing a function on the magnitude component of said Fourier transformed image to form an altered Fourier magnitude image, said function being commutative within a constant to rotation and scale;

taking the first or higher derivatives of the phase component of said Fourier transformed image to form an altered Fourier phase image;

combining said altered Fourier magnitude and altered Fourier phase images to form an altered Fourier transformed image; and performing an inverse Fourier transform on said altered Fourier transformed image to form said spatial domain representation.

4. The method as claimed in claim 3 wherein said altered Fourier phase image is formed by applying a Laplacian operator to said phase component of said Fourier transformed image.

5. The method as claimed in claim 3 wherein said altered Fourier magnitude and altered Fourier phase images are combined by using said altered Fourier magnitude image as a real part of said altered Fourier transformed image, and using said altered Fourier phase image as an imaginary part of said altered Fourier transformed image.

6. A method of generating a matching key for an image with said matching key being substantially invariant to rotation, scale and translation, said method comprising the steps of:

forming a complex valued image of said image by applying an operator to said image, said operator being commutative within a constant to rotation and scale;

forming a spatial domain representation of said complex valued image that is substantially invariant to translation of said complex valued image;

transforming at least one of rotation and scaling of said complex valued image in said spatial domain representation into translation to form a transformed image; and forming a spatial domain representation of said transformed image that is substantially invariant to translation of said transformed image, said spatial domain representation of said transformed image being said matching key for said image, wherein the step of forming said complex valued image comprises one of the following:

convolving said image with a complex kernel function and multiplying said image with the result of the convolution step, wherein said complex kernel function has the Fourier transform of:

$$K(u,v) = \frac{u+iv}{|u+iv|},$$

applying an energy operator to said image to form said complex valued image, wherein said energy operator is described by: $E[I] = ID^2 I - (DI)^2$, werein D is the derivative operator; or applying a uni-modular energy operator to said image to form said complex valued image, where said uni-modular energy operator is described by: $E'[I] = I D'^2 I - (D'I)^2$, wherein D' is the uni-modular derivative operator.

7. The method as claimed in claim 6, wherein the transforming step is achieved through log-polar resampling said representation.

8. The method as claimed in claim 6 wherein the step of forming said complex valued image comprises the further sub-step of:

normalizing the result of the convolving step before performing the multiplying step.

9. The method as claimed in claim 6 wherein the step of forming said complex valued image comprises the further sub-step of:

normalizing the result of the applying step.

10. The method as claimed in claim 6 wherein the step of forming said complex valued image comprises the further sub-step of:

multiplying said image with the result of the applying step before performing the multiplying step.

11. The method as claimed in claim 6 wherein the step of forming said complex valued image comprises the further sub-steps of:

normalizing the result of the applying step; and multiplying said image with the result of the normalizing step.

12. The method as claimed in claim 6 wherein said representations are in the spatial domain.

13. A method of storing a document in a database, said method comprising the steps of:

creating one or more images of said document;

generating a matching key for each image of said document according to claim 1;

storing said document and said matching keys in said database, wherein any one of said matching keys index said document.

14. An apparatus for generating a matching key for an image with said matching key being substantially invariant to rotation, scale and translation, said apparatus comprising:

means for forming a spatial domain representation of said image that is substantially invariant to translation of said image;

means for transforming at least one of rotation and scaling of said image in said spatial domain representation into translation to form a transformed image; and means for forming a spatial domain representation of said transformed image that is substantially invariant to translation of said transformed image, said spatial domain representation of said transformed image being said matching key for said image, wherein the means for forming said spatial domain representation of said image comprises means arranged for:

performing a Fourier transform of said image to form a Fourier transformed image;

performing a function on a magnitude component of said Fourier transformed image to form an altered Fourier transformed image, said function being commutative within a constant to rotation and scale; and performing an inverse Fourier transform on said altered Fourier transformed image to form said spatial domain representation.

15. An apparatus for generating a matching key for an image with said matching key being substantially invariant to rotation, scale and translation, said apparatus comprising:

means for forming a complex valued image of said image by applying an operator to said image, said operator being commutative within a constant to rotation and scale;

means for forming a spatial domain representation of said complex valued image that is substantially invariant to translation of said complex valued image;

means for transforming said spatial domain representation of said complex valued image to form a transformed image, wherein at least one of rotation and scaling of said complex valued image in said spatial domain representation is transformed into translation of said transformed image; and means for forming a representation of said transformed image that is substantially invariant to translation of said transformed image, said spatial domain representation of said transformed image being said matching key for said image, wherein the step of forming said complex valued image comprises one of the following:

means for convolving said image with a complex kernel function and multiplying said image with a result of the convolving, wherein said complex kernel function has the Fourier transform of:

$$K(u, v) = \frac{u + iv}{|u + iv|},$$

means for applying an energy operator to said image to form said complex valued image, wherein said energy operator is described by: $E[I] = ID^2 I - (DI)^2$, wherein $D$ is the derivative operator; or means for applying a unit-modular energy operator to said image to form said complex valued image, where said uni-modular energy operator is described by: $E'[I] = I D'^2 I - (D'I)^2$, wherein $D'$ is the uni-modular derivative operator.

16. A computer program product including a computer readable storage medium having recorded thereon a computer-executable program for causing a computer to perform the method according to claim 1.

* * * * *